(12) United States Patent
Nitsche et al.

(10) Patent No.: US 10,524,466 B2
(45) Date of Patent: Jan. 7, 2020

(54) OPTICAL FIBER CABLE PROTECTED FROM ANIMAL BITE

(71) Applicant: Halliburton Energy Services, Inc., Houston, TX (US)

(72) Inventors: Wolfgang Hartmut Nitsche, Humble, TX (US); John Laureto Maida, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/324,000

(22) PCT Filed: Sep. 22, 2016

(86) PCT No.: PCT/US2016/053115
§ 371 (c)(1),
(2) Date: Feb. 7, 2019

(87) PCT Pub. No.: WO2018/056986
PCT Pub. Date: Mar. 29, 2018

(65) Prior Publication Data
US 2019/0174741 A1  Jun. 13, 2019

(51) Int. Cl.
*G02B 6/44* (2006.01)
*A01M 29/24* (2011.01)
*G01V 1/18* (2006.01)

(52) U.S. Cl.
CPC ............ *A01M 29/24* (2013.01); *G01V 1/181* (2013.01); *G02B 6/443* (2013.01)

(58) Field of Classification Search
CPC ........ G01V 1/181; G01V 1/182; G01V 1/183; G01V 1/184; G01V 1/185
See application file for complete search history.

(56) References Cited

U.S. PATENT DOCUMENTS

| 4,309,072 A | 1/1982 | Tweeddale |
| 4,514,035 A | 4/1985 | Steinmann et al. |
| 4,557,560 A | 12/1985 | Bohannon, Jr. et al. |
| 4,815,896 A | 3/1989 | Fox et al. |
| 4,874,219 A | 10/1989 | Arroyo et al. |
| 5,042,903 A | 8/1991 | Jakubowski |
| 6,349,161 B1 * | 2/2002 | Gleason ............... G02B 6/4427 385/113 |
| 7,023,218 B1 * | 4/2006 | Eslambolchi ...... G01R 31/3333 324/509 |

(Continued)

FOREIGN PATENT DOCUMENTS

| EP | 0090585 A1 | 10/1983 |
| EP | 1313192 A1 | 5/2003 |
| WO | 2015/030822 A1 | 3/2015 |

OTHER PUBLICATIONS

U.S. Pat. No. 343,939, issued Jun. 15, 1886, D.H. Wilson, 5 pages.

(Continued)

*Primary Examiner* — John Bedtelyon
(74) *Attorney, Agent, or Firm* — John W. Wustenberg; Baker Botts L.L.P.

(57) ABSTRACT

Apparatuses and methods for providing voltage to a metal layer of an optical cable are provided. The metal layer may be configured to provide an electric shock to an animal upon contact.

20 Claims, 5 Drawing Sheets

(56) References Cited

U.S. PATENT DOCUMENTS

2015/0206403 A1    7/2015    Weinstein

OTHER PUBLICATIONS

Jones, V. "50 years of power fencing." Proceedings of the New Zealand Grassland Association. vol. 49. New Zealand Grassland Association., 1988.
International Search Report and Written Opinion issued in related PCT Application No. PCT/US2016/053115 dated Feb. 27, 2017, 11 pages.

* cited by examiner

OPTICAL FIBER CABLE PROTECTED FROM ANIMAL BITE

CROSS-REFERENCE TO RELATED APPLICATION

The present application is a U.S. National Stage Application of International Application No. PCT/US2016/053115 filed Sep. 22, 2016, which is incorporated herein by reference in its entirety for all purposes.

BACKGROUND

This disclosure generally relates to an optical fiber cable protected from animal bites.

Optical fibers are used in several contexts, for example for communication and for monitoring and sensing nearby conditions. For example, monitoring using optical fibers may be used to measure formation porosity, permeability, density, mineral content, electrical conductivity, and location of hydrocarbons. Monitoring properties and conditions over time may have significant value during exploration and production activities. Optical fibers are also used for communications.

Optical fibers used in the outdoors, for example in oilfields, are susceptible to animal chewing and gnawing. Such bites can be destructive to the optical cables and can be expensive and time-consuming to repair. In the context of oilfield operations, damaged optical cables can result in significant downtime.

Other approaches have been implemented to prevent animals from biting optical cables in an oilfield. For example, a perfume has been applied to the cables with a scent that is unpleasant to animals. However, this attempt was unsuccessful because the perfume was eventually removed by rain or normal handling of the cables during operation. Further, the scent was also unpleasant to humans who handle the cables. Further, while the scent may be unpleasant for animals such as cows, the scent might attract different animals such as rodents.

Another previous approach included placing the optical fibers within a steel pipe or strong steel mesh to physically prevent the harm caused by animal bites. While this reduces the risk of rodent damage, cows might be strong enough to damage the fibers through the steel pipe or strong steel mesh. Further, the thick steel protection increases the weight of the cables so that carrying and installing the cables becomes burdensome.

It is desirable to produce an optical fiber protected from animal bites that is also lightweight for purposes of handling and installing.

BRIEF DESCRIPTION OF THE DRAWINGS

These drawings illustrate certain aspects of certain embodiments of the present disclosure. They should not be used to limit or define the disclosure.

Figure 1:
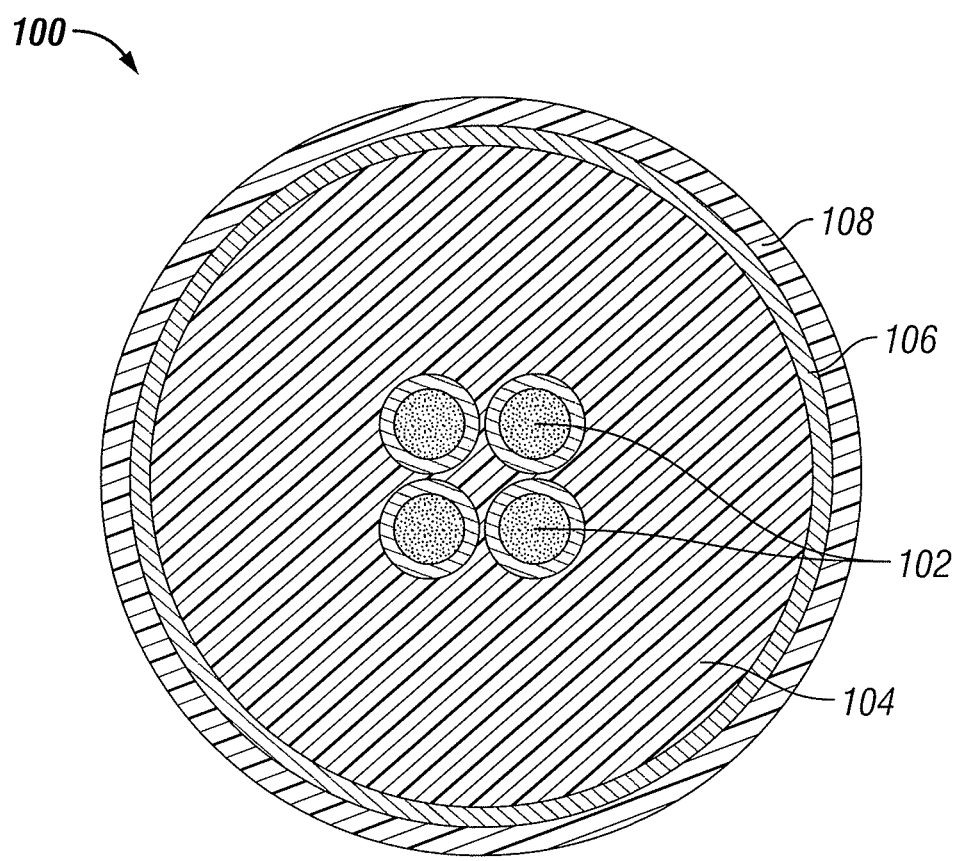
FIG. 1 depicts a cross-sectional view of an optical cable in accordance with one embodiment of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The terms "couple" or "couples" as used herein are intended to mean either an indirect or a direct connection. Thus, if a first device couples to a second device, that connection may be through a direct connection, or through an indirect electrical or mechanical connection via other devices and connections. The term "upstream" as used herein means along a flow path towards the source of the flow, and the term "downstream" as used herein means along a flow path away from the source of the flow. The term "uphole" as used herein means along the drillstring or the hole from the distal end towards the surface, and "downhole" as used herein means along the drillstring or the hole from the surface towards the distal end.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface. This could also include geothermal wells intended to provide a source of heat energy instead of hydrocarbons.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory ("RAM"), one or more processing resources such as a central processing unit ("CPU") or hardware or software control logic, ROM, and/or other types of nonvolatile memory. Additional components of the information handling system may include one or more disk drives, one or more network ports for communication with external devices as well as various input and output ("I/O") devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory ("EEPROM"), and/or flash memory; as well as communications media such as wires.

FIG. 1 illustrates a cross-sectional view of an example optical cable 100 according to aspects of the present disclosure. The optical cable 100 includes a plurality of optical fibers 102 at its relative center. The optical fibers 102 may be disposed within a plastic filling material or strength member 104. The strength member 104 may be disposed within a metal layer 106. The metal layer 106 may be disposed within an outer jacket 108. The outer jacket 108 may be a plastic. The optical cable may be coupled to a voltage source (not shown). For example, the optical cable may be coupled to a commercially-available electric fence controller (not shown).

Still referring to FIG. 1, the metal layer 106 may be any electrically conductive metal. The metal layer 106 may be a lightweight metal, preferably a low-cost, stable and nontoxic metal having a low resistivity density product. The metal layer 106 may have a high conductance to density ratio. For example, the metal layer may include aluminum or aluminum alloys. In an embodiment, the metal layer 106 is aluminum foil. In another embodiment, the metal layer 106 is a lightweight metal mesh. In another embodiment, the metal layer 106 may be a braided wire or twisted wire. The metal layer 106 may be lightweight enough such that the optical cable 100 may be easily picked up and transported across a distance such as an oil field. For example, the metal layer 106 may be made of aluminum foil or a sparse braid, surfe, or mesh of thin copper wires. The metal layer 106 may be thin, again, to keep the mass of the optical cable 100 low for transportability purposes. In an embodiment, the strength member 104 may be made of Kevlar®, aramid, or other strong polymers like Vectran®. The outer jacket 108 may be an isolator, preferably polyurethane, polyvinyl chloride (PVC), polypropylene, or polyethylene.

In operation, the metal layer 106 may carry a voltage relative to ground. The metal layer 106 may carry a pulsed voltage relative to ground. For example, during each pulse, the voltage may be applied for a period of 0.3 milliseconds, followed by a period of about one second in which the voltage is not applied. A relatively short pulse duration prevents the risks of electrocution, paralysis through muscle contractions or starting of dry vegetation fires. In an embodiment, while the pulse is on, the voltage may be high. For example, the voltage may be greater than or equal to 5000 volts. The metal layer 106 may carry a low average current. In an embodiment, the metal layer 106 may carry an average current equal to or lower than 10 mA. The average current carried by the metal layer 106 may be limited to 10 mA. In some embodiments, the current carried by the metal layer 106 may be close to zero. However, the peak current carried by the metal layer 106 may be much higher than the average current. The peak current may be high to assure effectiveness at a distance through an optical cable 100 that may be damaged and/or electrically leaky. The voltage source (not shown) may have low impedance. As such, even if the optical cable 100 contains current leaks (for example, if some animals have damaged the outer jacket 108), the optical cable 100 will maintain a high voltage when the pulse is applied.

In operation, if an animal bites or chews the optical cable 100, its teeth may damage the outer jacket 108 and reach the metal layer 106. The animal will receive an electrical shock when touching the metal layer 106. At that time, the animal will stop damaging the optical cable 100 before damaging the optical fibers 102. The electrical shock will teach the animal to stop biting the optical cable 100. In any case, however, the animal will receive an electrical shock every time it touches the metal layer 106. The pulsed nature of the voltage applied to the metal layer 106 will prevent the animal from experiencing prolonged muscle contraction.

Figure 2:
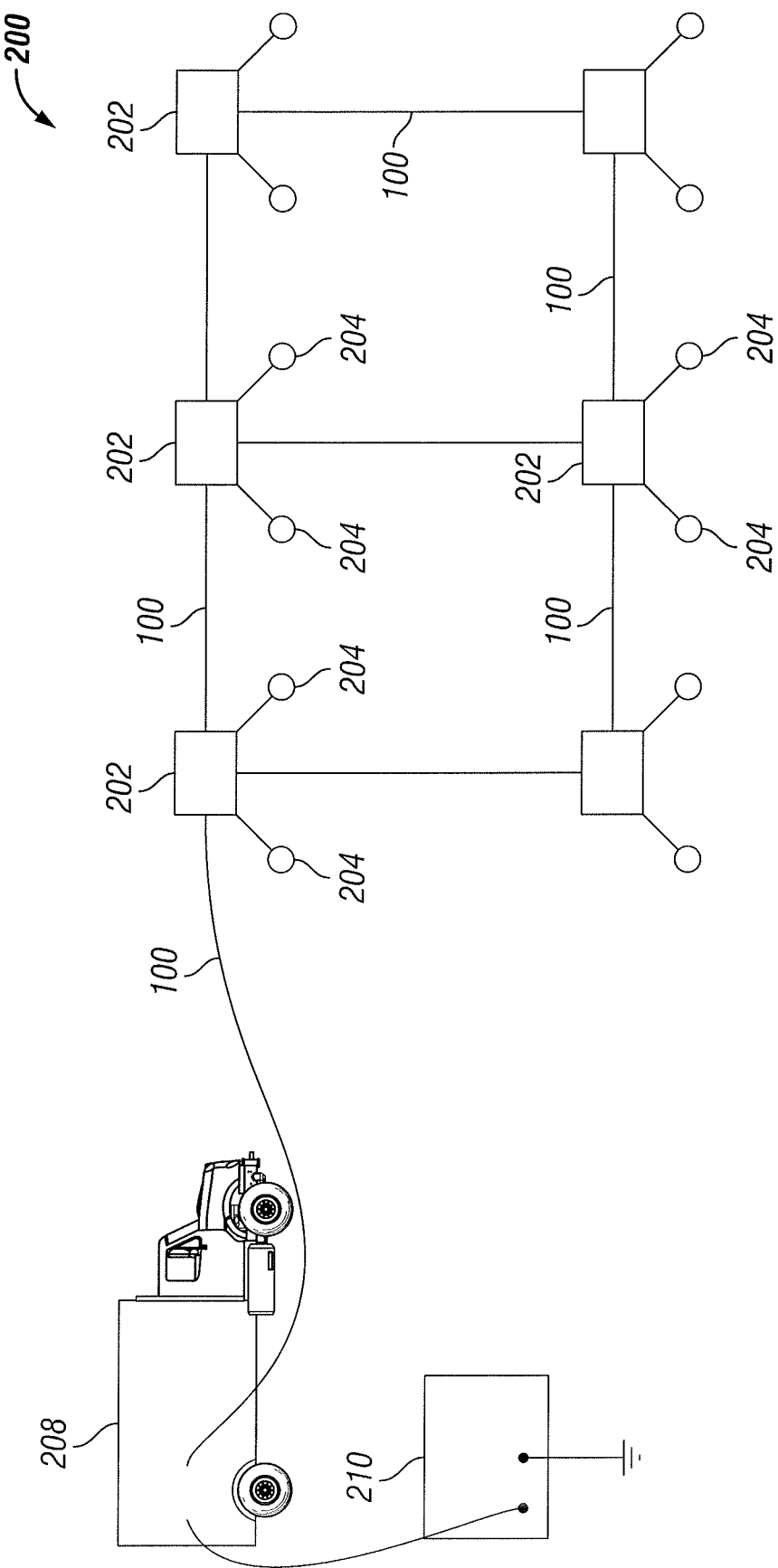
FIG. 2 depicts a schematic view of a data acquisition system in accordance with one embodiment of the present disclosure.

Referring now to FIG. 2, a schematic view of a data acquisition system 200 is shown. The data acquisition system 200 includes a plurality of data acquisition nodes 202 that may be spread out over a large area. The data acquisition nodes 202 may be battery powered and may be located above-ground. The data acquisition nodes 202 may be coupled to one or more sensors 204. For example, the sensors 204 may be geophone sensors. Alternatively, the data acquisition nodes 202 may include an electronic box and the sensors 204 may be electrical sensors. Each data acquisition node 202 is coupled to an optical cable 100. The optical cable 100 may be configured as described above in connection with FIG. 1. The distance between the data acquisition nodes 202 may be 100 meters or more. The data acquisition nodes 202 may be coupled to a recording room 208 via the optical cable 100. In operation, the data acquisition nodes may communicate with the recording room 208. Data may include a wide variety of data types, including seismic data, microseismic data, or video data. The optical cable 100 may be electrically coupled to a voltage generator 210. In operation, the voltage generator 210 may operate to provide voltage to the metal layer 106 of the optical cable 100 as described above in connection with FIG. 1.

In operation, the data acquisition system 200 may be located in an oilfield. The data acquisition system 200 may be used in a location and then transported to a second location by one or more operators. Thus, it is advantageous that the data acquisition system 200, and in particular the optical cable 100, be lightweight. This allows the operators to transport the data acquisition system 200 more easily.

Figure 3:
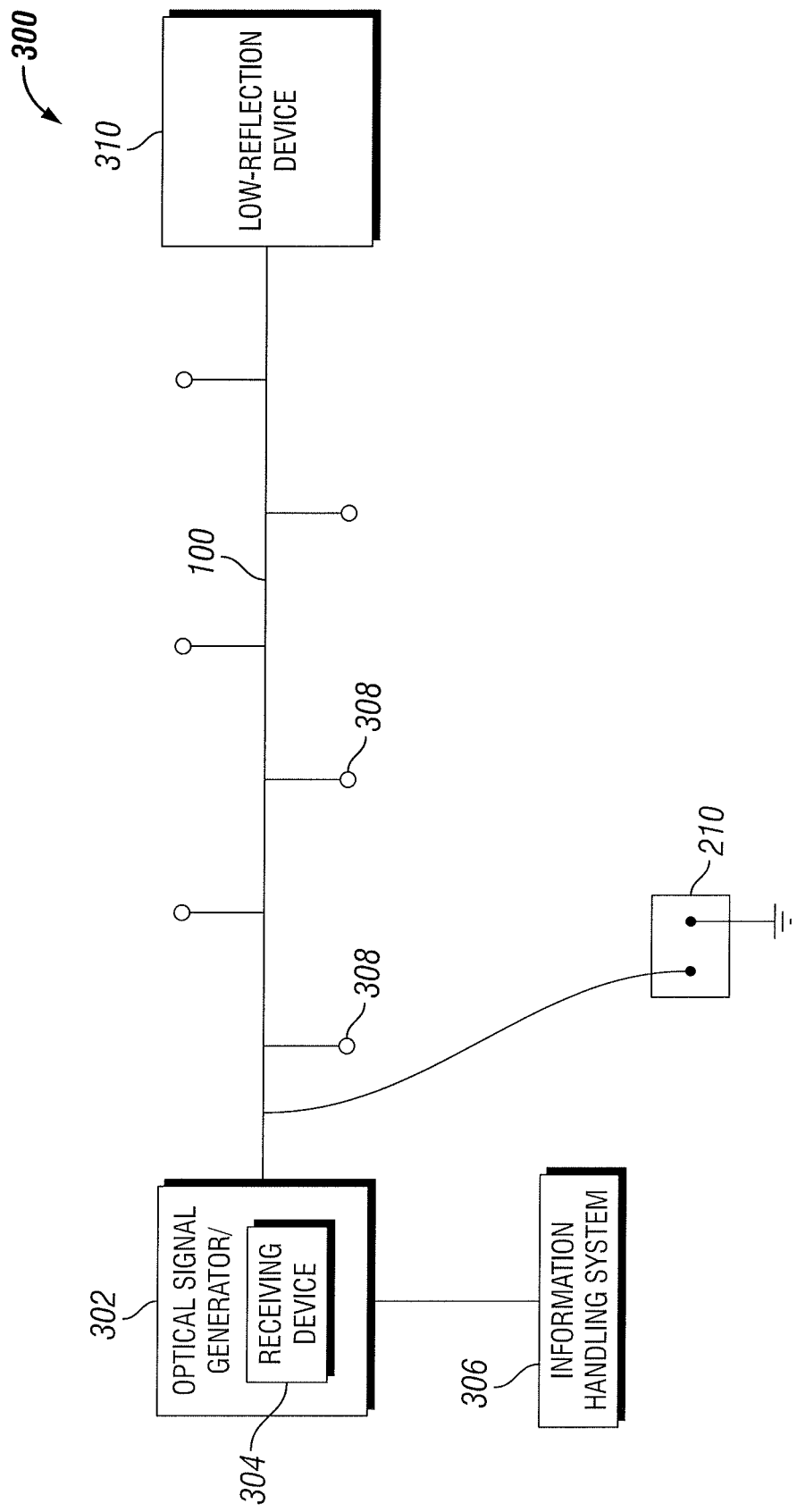
FIG. 3 depicts a schematic view of a distributed acoustic sensing system in accordance with one embodiment of the present disclosure.

FIG. 3 illustrates an example distributed acoustic sensing system 300 according to one embodiment of the present disclosure. An optical signal generator 302 may be coupled to the optical cable 100. The optical signal generator 302 may also function as a receiving device or may include a receiving device 304. The optical cable 100 may be configured as described above in connection with FIG. 1. The optical cable 100 may be located above ground. The optical signal generator 302 may include associated opto-electronics and laser. Optical pulses from the optical signal generator 302 may be amplified using optical gain elements, such as any suitable amplification mechanisms including, but not limited to, Erbium Doped Fiber Amplifiers (EDFAs) or Semiconductor Optical Amplifiers (SOAs). The optical cable 100 may also be coupled to a low-reflection device 310, as shown in FIG. 3. The low reflection device 310 may be positioned at the opposite end of the optical cable 100 from the optical signal generator 302.

Still referring to FIG. 3, the optical signal generator 302 may include a receiving device 304. Optionally, the optical cable 100 may be coupled to a receiving device that is separate from the optical signal generator 302. The receiving device 304 may be a photodetector assembly. The receiving device 304 may include associated optics and signal processing electronics (not shown). The receiving device 304 may be a semiconductor electronic device that uses the photoelectric effect to convert light to electricity. The receiving device 304 may be an avalanche photodiode or a pin photodiode but is not intended to be limited to such. The receiving device 304 may convert the optical signal (i.e., the interferometric signal) to an electronic signal proportional to the acoustic signal along the optical cable 100. The receiving device 304 may be coupled to an information handling system 306. The receiving device 304 and information handling system 306 may be communicatively and/or mechanically coupled. A first device may be communicatively coupled to a second device if it is connected to the second device through a wired or wireless communication network which permits the transmission of information. The information handling system 306 may also be communicatively or mechanically coupled to the optical signal generator 302. The receiving device 304 may integrate or add up the number of photons received in a given time period.

Still referring to FIG. 3, backscattered light (not shown) may consist of an optical light wave or waves with a phase that is altered by changes to the optical path length at some location or locations along the optical cable 100 caused by vibration or acoustically induced strain. By sensing the phase of the backscattered light signals, it is possible to quantify the vibration or acoustics along the optical cable 100. The receiving device 304 may provide output relating to the backscattered light to the information handling system 306, which may convey the data to a display and/or store it in computer-readable media. In some embodiments, the optical cable 100 may be coupled to one or more point sensors 308 The point sensors 308 may include velocity or acceleration sensing geophones.

In operation of the system 300, the optical signal generator 302 may generate a first optical pulse which is transmitted through the optical fiber 100. In certain implementations, the optical signal generator 302 may be a laser. At least a portion of the optical fiber 100 may be arranged in coils. As the first optical pulse travels through the optical fiber 100, imperfections and vibrations in the optical fiber 100 may cause a portion of the light to be backscattered along the optical fiber 100 due to Rayleigh scattering. Scattered light according to Rayleigh scattering is returned to the receiving device 304 from every point along the optical fiber 100 along the length of the optical fiber 100. This backscatter effect may be referred to as Rayleigh backscatter. Density fluctuations in the optical fiber 100 may give rise to energy loss due to the scattered light, with the following coefficient:

$$\alpha_{scat} = \frac{8\pi^3}{3\lambda^4} n^8 p^2 k T_f \beta$$

where n is the refraction index, p is the photoelastic coefficient of the optical fiber 100, k is the Boltzmann constant, and β is the isothermal compressibility. $T_f$ is a fictive temperature, representing the temperature at which the density fluctuations are "frozen" in the material. The optical cable 100 may be terminated with a low reflection device 310. In certain implementations, the low reflection device 310 may be a fiber coiled and tightly bent to violate Snell's law of total internal reflection such that all the remaining energy is sent out of the fiber. In other implementations, the low reflection device 310 may be an angle cleaved fiber. In still other implementations, the low reflection device 310 may be a coreless optical fiber with high optical attenuation. In still other implementations, the low reflection device 310 may be a termination, such as the AFL Endlight.

Additional optical pulses may be sent into the optical fibers 102 from the optical signal generator 302 in close succession and at a fixed rate. By measuring the backscattered light from each of these optical pulses at the receiving device 304, a discrete representation of the change in acoustic energy may be measured as a function of time. The changes in acoustic energy may then be correlated with sub-surface events. For example, a change in acoustic energy may be related to a change in flow, a change in solids in a fluid, or a change in the oil/water/gas ratio present in a wellbore. The optical signal generator 302 may be operable to vary the pulse width of optical pulses it generates. The optical cable 100 may be configured to collect information relating to temperature, stress, sound, chemicals, and acoustics through the use of Rayleigh backscattering.

Still referring to FIG. 3, the optical cable 100 may be coupled to a voltage generator 210 as described above in connection with FIG. 2. Specifically, the voltage generator 210 may be coupled to the metal layer 106 of the optical cable 100. In operation, the voltage generator 210 may operate to provide voltage to the metal layer 106 of the optical cable 100 as described above in connection with FIG. 1.

Figure 4:
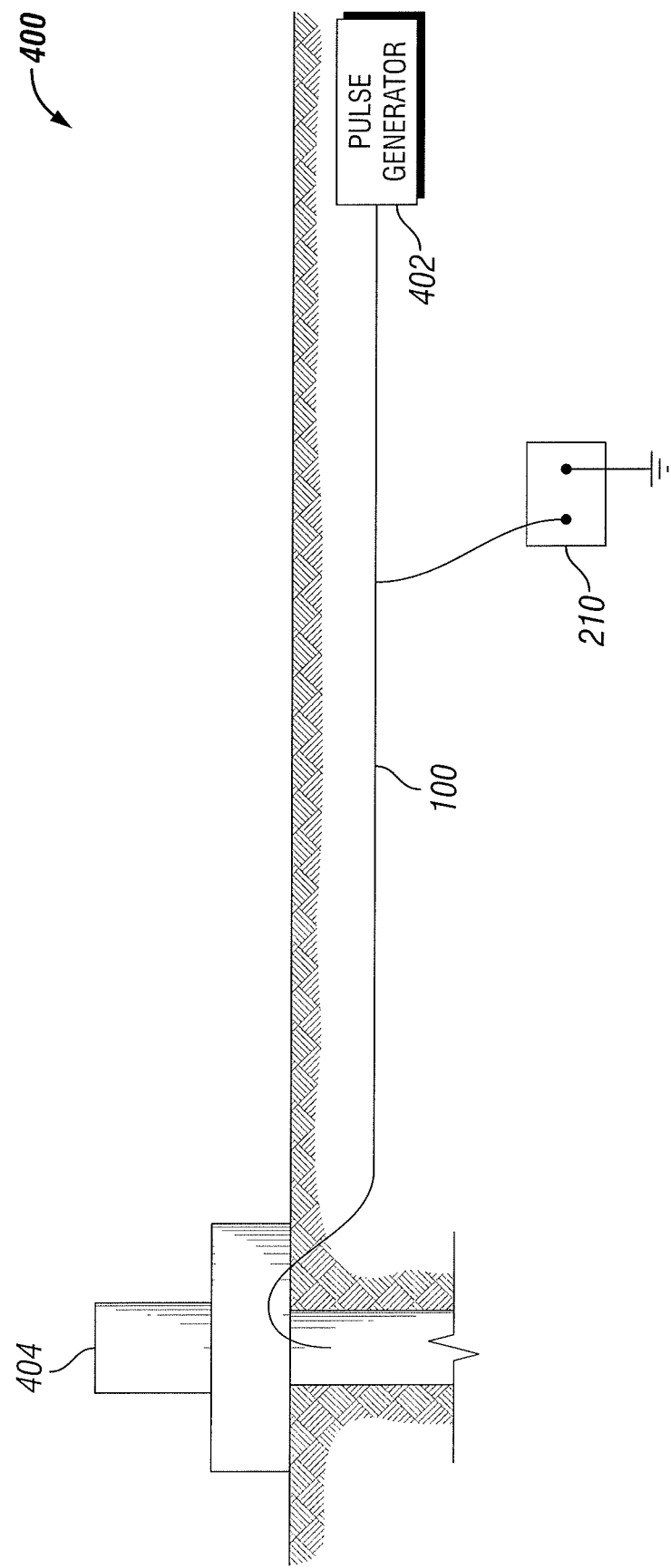
FIG. 4 depicts a schematic view of a distributed acoustic sensing system in accordance with an alternative embodiment of the present disclosure.

FIG. 4 illustrates an example distributed acoustic sensing system 400 according to an embodiment of the present disclosure. The optical cable 100 may be configured as described above in connection with FIG. 1. The optical cable 100 may be located beneath the earth's surface. As such, it is advantageous that the optical cable 100 be protected from bites of animals such as rodents that may travel beneath the earth's surface. The optical cable 100 may be coupled to an optical signal generator 402. The optical cable 100 may also be coupled to a wellhead 404. The optical cable 100 may run adjacent to a pipeline, in some embodiments. As described above with respect to FIG. 3, the optical cable 100 may be configured to collect information relating to temperature, stress, sound, chemicals, and acoustics through the use of Rayleigh backscattering. Further, the optical cable 100 may transmit digital data from the wellhead 404 to a receiving device (not shown). The receiving device (not shown) may be co-located with the optical pulse generator 402 or it may be located at a remote location.

Still referring to FIG. 4, the optical cable 100 may be electrically coupled to a voltage generator 210. In operation, the voltage generator 210 may operate to provide voltage to the metal layer 106 of the optical cable 100 as described above in connection with FIG. 1.

Figure 5:
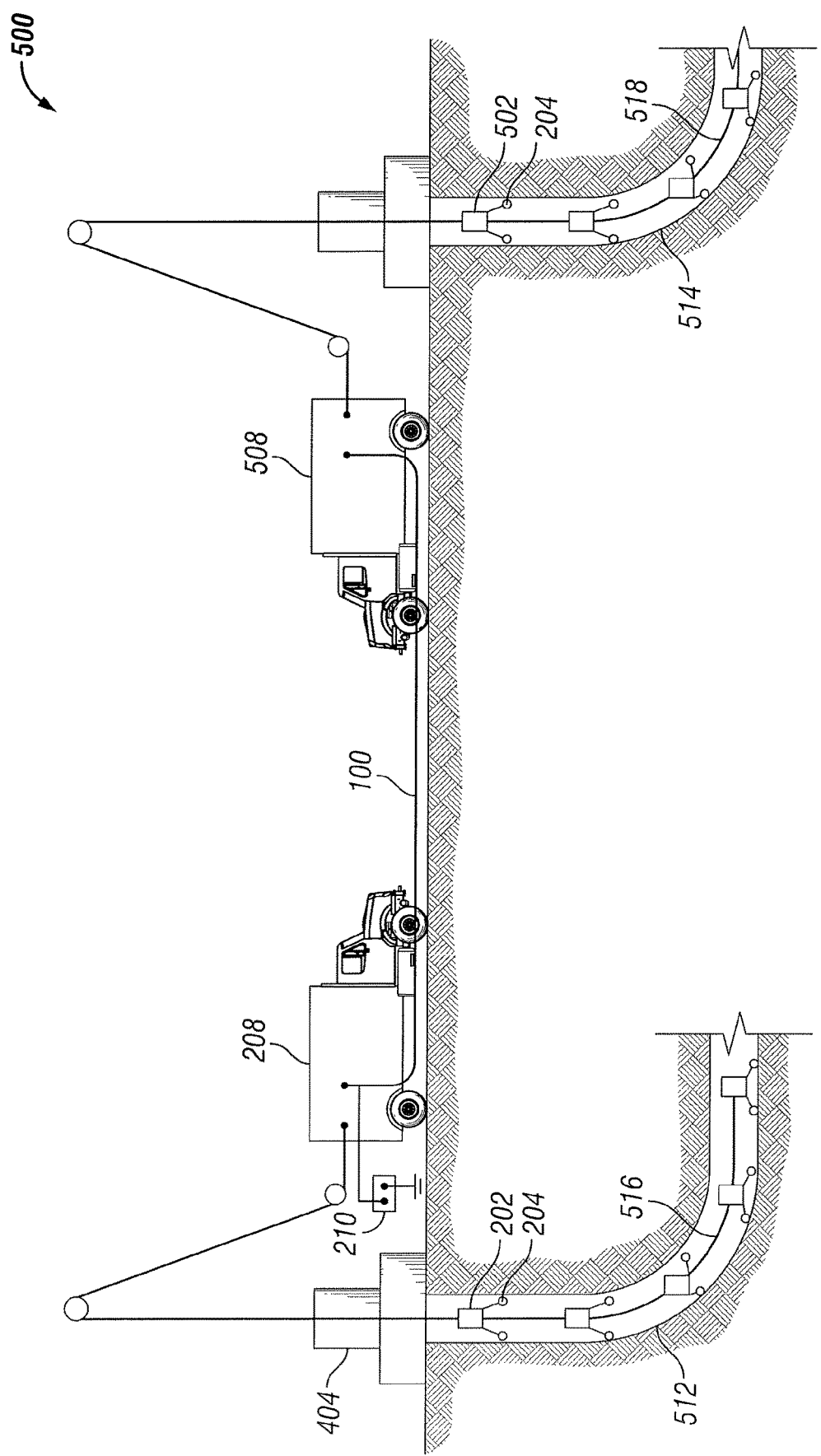
FIG. 5 depicts a schematic view of a data acquisition and communication system in accordance with one embodiment of the present disclosure.

Turning now to FIG. 5, an example data acquisition and communication system 500 is depicted according to an embodiment of the present disclosure. The optical cable 100 may be coupled to a first recording room 208 and to a remote recording room 508. The optical cable 100 may be configured as described above in connection with FIG. 1. The optical cable 100 may be located at or above the earth's surface (as shown in FIG. 5), or it may be located beneath the earth's surface. The distance between the first recording room 208 and the remote recording room 508 may be 100 meters or more.

Still referring to FIG. 5, a first plurality of data acquisition nodes 202 may be disposed within a first wellbore 512. A second plurality of data acquisition nodes 502 may be disposed within a remote wellbore 514. As discussed above in connection with FIG. 2, the data acquisition nodes 202 and 502 may be battery powered. Each data acquisition node 202 and 502 may be coupled to one or more sensors 204. For example, the sensors 204 may be geophone sensors. The first plurality of data acquisition nodes 202 may be coupled to a cable 516. The second plurality of data acquisition nodes may be coupled to a cable 518. The cables 516 and 518 may be optical cables or copper cables or any other cables that may be utilized to transmit data.

In operation of the system 500, the first plurality of data acquisition nodes 202 may communicate with the first recording room 208. The second plurality of data acquisition nodes 502 may communicate with the remote recording room 508. Data may include a wide variety of data types, including seismic data, microseismic data, or video data. Further, it may be advantageous to collect data from the first wellbore 512 and the remote wellbore 514 at a single location. For example, it may be advantageous for the first recording room 208 to establish two-way communications with the remote recording room 508. Thus, in case of an outage, data loss will be minimized. Further, additional data transmission from the system 500 to a remote location may be facilitated in this manner. Thus, the first recording room 208 and the remote recording room 508 may communicate via the optical cable 100. The first recording room 208 and/or the remote recording room 508 may also send commands via the optical cable 100. For example, the first recording room 208 may issue a command to the remote data room 508 to start or stop recording or to change a gain setting.

Still referring to FIG. 5, the optical cable 100 may be electrically coupled to a voltage generator 210. In operation, the voltage generator 210 may operate to provide voltage to the metal layer 106 of the optical cable 100 as described above in connection with FIG. 1.

An embodiment of the present disclosure is an apparatus comprising: a plurality of optical fibers disposed within a first strength member; an electrically-conductive, lightweight metal layer disposed about the first strength member; an outer jacket disposed about the metal layer; and a voltage source coupled to the metal layer. The voltage source may be configured to provide a voltage to the metal layer relative to ground. The metal layer may optionally include aluminum foil or metal mesh. The voltage may optionally be a pulsed high voltage. The pulsed high voltage may optionally be greater than 5000 volts. The average current carried on the metal layer may optionally be limited to less than 10 mA. Optionally, the metal layer may be configured to provide an electric shock to an animal upon contact. The apparatus may optionally include an optical pulse generator coupled to the plurality of optical fibers and a low reflection device coupled to the plurality of optical fibers. The apparatus may optionally include a receiving device coupled to the plurality of optical fibers. The receiving device may optionally be configured to collect backscattered light. Optionally a geophone sensor may be coupled to the optical cable.

Another embodiment of the present disclosure is a method comprising: provisioning an optical cable and applying a voltage to the metal layer relative to ground. The optical cable may comprise a plurality of optical fibers disposed within a metal layer; and an outer jacket disposed about the metal layer. The metal layer may be configured to provide an electric shock to an animal upon contact. Optionally, the metal layer may include aluminum foil. Optionally, the metal layer may include metal mesh. Optionally, the voltage may be a pulsed high voltage. Optionally, the pulsed high voltage may be greater than 5000 volts. Optionally, the average current carried on the metal layer may be limited to less than 10 mA. Optionally, the method may further include providing an electric shock to an animal upon contact between the animal and the metal layer. Optionally, the method may further include collecting data at a geophone sensor coupled to the optical cable. Optionally, the method may further include applying an optical signal to the plurality of optical fibers. Optionally, the method may further include receiving backscattered light at a receiving device.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. An apparatus comprising:
a plurality of optical fibers disposed within a first strength member;
an electrically-conductive, lightweight metal layer disposed about the first strength member;
an outer jacket disposed about the metal layer; and
a voltage source coupled to the metal layer,
wherein the voltage source is configured to provide a voltage to the metal layer relative to ground, and
wherein an electric shock, based on the voltage to the metal layer relative to ground, is provided to an animal when the animal touches the metal layer.

2. The apparatus of claim 1, wherein the metal layer comprises aluminum foil.

3. The apparatus of claim 1, wherein the metal layer comprises metal mesh.

4. The apparatus of claim 1, wherein the voltage is a pulsed high voltage.

5. The apparatus of claim 4, wherein the pulsed high voltage is greater than 5000 volts.

6. The apparatus of claim 1, wherein the average current carried on the metal layer is limited to less than 10 mA.

7. The apparatus of claim 1, wherein the metal layer is configured to provide an electric shock to an animal upon contact.

8. The apparatus of claim 1, further comprising:
an optical pulse generator coupled to the plurality of optical fibers; and
a low reflection device coupled to the plurality of optical fibers.

9. The apparatus of claim 8, further comprising:
a receiving device coupled to the plurality of optical fibers, wherein the receiving device is configured to collect backscattered light.

10. The apparatus of claim 8, further comprising:
a geophone sensor coupled to the optical cable.

11. A method comprising:
provisioning an optical cable,
  wherein the optical cable comprises:
    a plurality of optical fibers disposed within a metal layer; and
    an outer jacket disposed about the metal layer; and
applying a voltage to the metal layer relative to ground; and
providing an electric shock, based on the voltage to the metal layer relative to ground, to an animal upon contact between the animal and the metal layer.

12. The method of claim 11, wherein the metal layer comprises aluminum foil.

13. The method of claim 11, wherein the metal layer comprises metal mesh.

14. The method of claim 11, wherein the voltage is a pulsed high voltage.

15. The method of claim 14, wherein the pulsed high voltage is greater than 5000 volts.

16. The method of claim 11, wherein the average current carried on the metal layer is limited to less than 10 mA.

17. The method of claim 11, further comprising:
providing an electric shock to an animal upon contact between the animal and the metal layer.

18. The method of claim 11, further comprising:
collecting data at a geophone sensor coupled to the optical cable.

19. The method of claim 11, further comprising:
applying an optical signal to the plurality of optical fibers.

20. The method of claim 19, further comprising:
receiving backscattered light at a receiving device.

* * * * *